US008687854B2

(12) United States Patent
Guo (10) Patent No.: US 8,687,854 B2
(45) Date of Patent: Apr. 1, 2014

(54) INFORMATION PROCESSING APPARATUS, CONTROL METHOD FOR THE SAME, AND COMPUTER-READABLE STORAGE MEDIUM

(75) Inventor: Muling Guo, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 780 days.

(21) Appl. No.: 12/903,717

(22) Filed: Oct. 13, 2010

(65) Prior Publication Data

US 2011/0255792 A1 Oct. 20, 2011

(30) Foreign Application Priority Data

Oct. 20, 2009 (JP) ................................. 2009-241886

(51) Int. Cl.
*G06K 9/00* (2006.01)

(52) U.S. Cl.
USPC ............................ 382/118; 382/103; 382/199

(58) Field of Classification Search
USPC ......................................... 382/103, 118, 199
See application file for complete search history.

(56) References Cited

U.S. PATENT DOCUMENTS

| | | | | | |
|---|---|---|---|---|---|
| 5,832,115 | A | * | 11/1998 | Rosenberg | ..................... 382/199 |
| 5,930,391 | A | * | 7/1999 | Kinjo | ............................ 382/173 |
| 8,463,029 | B2 | * | 6/2013 | Guo | .............................. 382/165 |
| 8,542,943 | B2 | * | 9/2013 | Basso et al. | .................... 382/274 |
| 8,577,151 | B2 | * | 11/2013 | Hu | ................................ 382/195 |
| 2004/0240706 | A1 | * | 12/2004 | Wallace et al. | ............... 382/103 |
| 2005/0196015 | A1 | * | 9/2005 | Luo et al. | ....................... 382/103 |
| 2006/0078163 | A1 | * | 4/2006 | Rui et al. | ....................... 382/103 |
| 2006/0187305 | A1 | * | 8/2006 | Trivedi et al. | ................. 348/169 |
| 2009/0027502 | A1 | * | 1/2009 | Yang | .............................. 348/169 |
| 2009/0169066 | A1 | * | 7/2009 | Yang et al. | ..................... 382/118 |
| 2011/0164816 | A1 | * | 7/2011 | Guo | .............................. 382/165 |
| 2011/0255792 | A1 | * | 10/2011 | Guo | .............................. 382/199 |
| 2013/0083976 | A1 | * | 4/2013 | Ragland | ........................ 382/117 |

OTHER PUBLICATIONS

Zou et al., "Real-Time Elliptical Head Contour Detection Under Arbitrary Pose and Wide Distance Range", Elsevier, 2009.*
Mai et al., "A Hierarchical Approach for Fast and Robust Ellipse Extraction", IEEE, 2007.*
Huang et al., "Robust Real-Time Detection, Tracking, and Pose Estimation of Faces in Video Streams", ICPR 2004.*
Sirohey, Saad A., "Human Face Segmentation and Identification", Nov. 1993.*
M. H. Yang, D. J. Kriegman, N. Ahuja, "Detecting Faces in Images: A Survey", IEEE Trans. on PAMI, vol. 24, No. 1, pp. 34-58, Jan. 2002.
Viola, M. Jones, et al., "Robust Real-time Object Detection", Proc. of IEEE Workshop SCTV, Jul. 2001, pp. 1-25.

(Continued)

*Primary Examiner* — Aaron W Carter
(74) *Attorney, Agent, or Firm* — Fitzpatrick, Cella, Harper & Scinto (57) ABSTRACT

An information processing apparatus includes: a detection unit that detects, as edge pixels, a plurality of pixels in a contour of a head of a person in an image in which the head appears; a determination unit that, for each of the edge pixels, determines, as ellipse candidates, a plurality of ellipses that pass through the edge pixel in a parameter section including predetermined parameters that define an ellipse; a calculation unit that, for each of the edge pixels, calculates an evaluation value based on, for each of the ellipse candidates determined for the edge pixel, a position of the edge pixel in the ellipse candidate; an accumulation unit that accumulates the evaluation values for each of the ellipse candidates; and a selection unit that selects an ellipse candidate having the highest accumulated evaluation value from the ellipse candidates as the head ellipse.

8 Claims, 10 Drawing Sheets

(56) References Cited

OTHER PUBLICATIONS

R.O Duda, P. E. Hart, "Use of the Hough Transformation to Detect Lines and Curves in Pictures", Comm. ACM, vol. 15, pp. 11-15, Jan. 1972.

Stan Birchfield, "Elliptical Head Tracking Using Intensity Gradients and Color Histograms", Proc. IEEE International Conference on Computer Vision and Pattern Recognition (CVPR '98), Santa Barbara, California, pp. 232-237, Jun. 1998.

* cited by examiner

CIRCUMSCRIBED RECTANGLE OF HEAD DETECTION REGION

INFORMATION PROCESSING APPARATUS, CONTROL METHOD FOR THE SAME, AND COMPUTER-READABLE STORAGE MEDIUM

BACKGROUND OF THE INVENTION

1. Field of the Invention

The present invention relates to an information processing apparatus, a control method for the same, and a computer-readable storage medium, and in particular to technology for detecting a head region in an image of a person captured by an imaging apparatus (camera).

2. Description of the Related Art

In recent years, attention has been placed on a function for automatically controlling camera focus and exposure, camera panning, tilting, and zooming, and the like by specifying and tracking the position of a designated person in an image or video captured by an imaging apparatus such as a camera.

In order to specify a person's position, generally the person's face pattern is detected, and the movement thereof is tracked. Examples of such technology for detecting a face in an image include the various techniques disclosed in M. H. Yang, D. J. Kriegman, N. Ahuja, "Detecting Faces in Images: A Survey", IEEE Trans. on PAMI, vol. 24, no. 1, pp. 34-58, January, 2002. In particular, due to its high detection rate and execution speed, the AdaBoost base technique by Viola et al. is widely used in face-detection technology (see P. Viola, M. Jones, "Robust Real-time Object Detection", Proc. of IEEE Workshop SCTV, July, 2001).

In order to specify a person's position, it is not sufficient to merely detect and track the person's face pattern. There are cases where a face pattern cannot be detected due to the person's face turning to the side, turning around, or the like. Detecting and tracking a head region instead of a face is an effective alternative technique.

In order to detect a head region, a technique of detecting an elliptical shape with use of Hough transformation has been known for a long time (see R. O Duda, P. E. Hart, "Use of the Hough Transformation to Detect Lines and Curves in Pictures", Comm. ACM, vol. 15, pp. 11-15, January, 1972). Also, in recent years, Stan Birchfield and others have been researching the detection of the elliptical shape of a head with use of gradient information regarding the circumference of an ellipse and color histogram matching in the interior of an ellipse (see Stan Birchfield, "Elliptical Head Tracking Using Intensity Gradients and Color Histograms", Proc. IEEE International Conference On Computer Vision and Pattern Recognition (CVPR '98), Santa Barbara, Calif., pp. 232-237, June, 1998).

Although images and videos in which a person appears are individually different, generally the edge at the top of the head is relatively stable and is a good feature indicating the head. However, many upper body edges exist below a person's head, and there are often horizontal edges and vertical edges in the background region. These edges may be detected as head ellipses when Hough transformation or the technique developed by Stan Birchfield and others is used to detect a head ellipse, and there are cases where the edge at the top of the head, which is the feature indicating the head, cannot be properly detected. Also, depending on the combination of a background edge and a head edge, they may be detected as a large elliptical arc, and there are cases where the edge at the top of the head cannot be properly detected.

SUMMARY OF THE INVENTION

In view of this, the present invention aims to provide technology that enables highly accurately detecting, in an image in which a person's head appears, of a head ellipse that approximates the contour of the head, by reducing the negative influence of edges of the person's upper body and background noise edges.

According to one aspect of the present invention, an information processing apparatus includes: a detection unit that detects, as edge pixels, a plurality of pixels in a contour of a head of a person in an image in which the head appears; a determination unit that, for each of the edge pixels, determines, as ellipse candidates, a plurality of ellipses that pass through the edge pixel in a parameter section including predetermined parameters that define an ellipse; a calculation unit that, for each of the edge pixels, calculates an evaluation value based on, for each of the ellipse candidates determined for the edge pixel, a position of the edge pixel in the ellipse candidate; an accumulation unit that accumulates the evaluation values for each of the ellipse candidates; and a selection unit that selects an ellipse candidate having the highest accumulated evaluation value from the ellipse candidates as the head ellipse.

Another aspect of the present invention, a control method for an information processing apparatus that determines, in an image in which a head of a person appears, a head ellipse approximating a contour of the head, includes the steps of: detecting, as edge pixels, a plurality of pixels in the contour of the head in the image; determining, for each of the edge pixels, as ellipse candidates, a plurality of ellipses that pass through the edge pixel in a parameter section including predetermined parameters that define an ellipse; calculating, for each of the edge pixels, an evaluation value based on, for each of the ellipse candidates determined for the edge pixel, a position of the edge pixel in the ellipse candidate; accumulating the evaluation values for each of the ellipse candidates; and selecting an ellipse candidate having the highest accumulated evaluation value from the ellipse candidates as the head ellipse.

Further features of the present invention will become apparent from the following description of exemplary embodiments with reference to the attached drawings.

DESCRIPTION OF THE EMBODIMENTS

Below is a detailed description of embodiments of the present invention with reference to the attached drawings.

Functional Configuration

Figure 1:
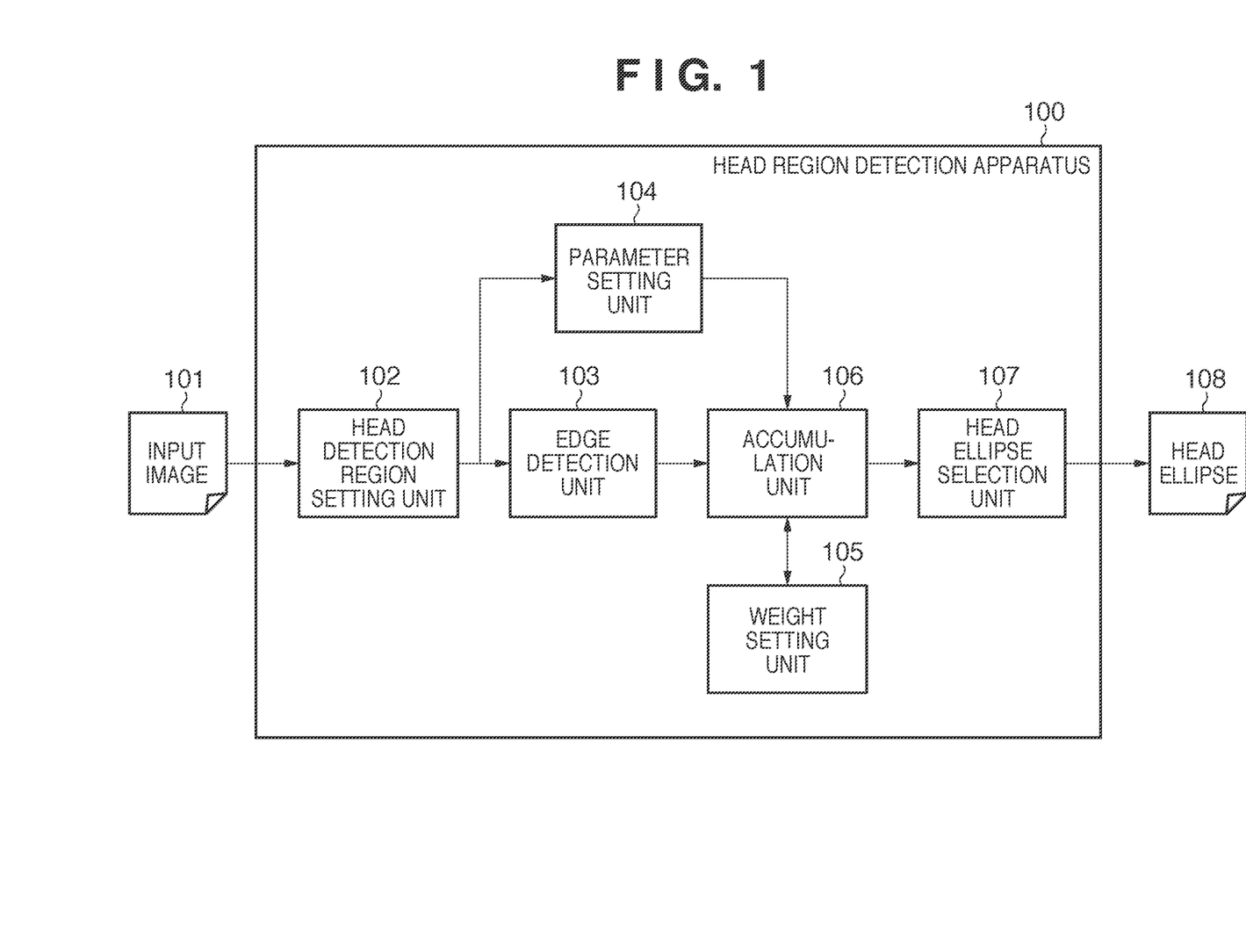
FIG. 1 is a block diagram showing an example of a functional configuration of a human head region detection apparatus.

FIG. 1 is a block diagram showing an example of a functional configuration of a head region detection apparatus (information processing apparatus) 100 that detects a person's head region.

A head-detection-region setting unit 102 sets a relatively large region containing a person's head as a head-detection region in an image or video (hereinafter, referred to as an input image) 101 that has been input. An edge detection unit 103 obtains an edge image of the head-detection region by performing edge detection on the head-detection region set by the head-detection-region-region setting unit 102, with use of an edge detection operator, such as Sobel or Prewitt.

A parameter setting unit 104 sets parameter variation ranges of a head ellipse based on the head-detection region set by the head-detection-region setting unit 102. For example, the following parameter variation ranges are set.

Variation range for ellipse central coordinate (x0, y0): [minimum value of x0, maximum value of x0] and [minimum value of y0, maximum value of y0]

Variation range for ellipse ordinate-axis length b and abscissa-axis length a: [minimum value of b, maximum value of b] and [minimum value of a, maximum value of a]

Variation range for ellipse slope angle θ: [minimum value of θ, maximum value of θ]

Hereinafter, all combinations of parameter values in the set ellipse parameter variation ranges will be referred to as the ellipse parameter section.

A weight setting unit 105 sets a weight for each edge pixel detected by the edge detection unit 103, based on the position where the edge pixel exists on an ellipse in the parameter section set by the parameter setting unit 104. An accumulation unit 106 accumulates edge-pixel weights set by the weight setting unit 105 in the ellipse parameter section set by the parameter setting unit 104. Based on the weighted numbers of edge pixels (edge-pixel counts) obtained by the accumulation unit 106, a head-ellipse selection unit 107 selects and outputs the ellipse having the highest accumulated value as a head ellipse 108. In this way, the head region detection apparatus 100 determines, in an image in which a person's head appears, a head ellipse that approximates the contour of the head.

Processing Procedure

Figure 2:
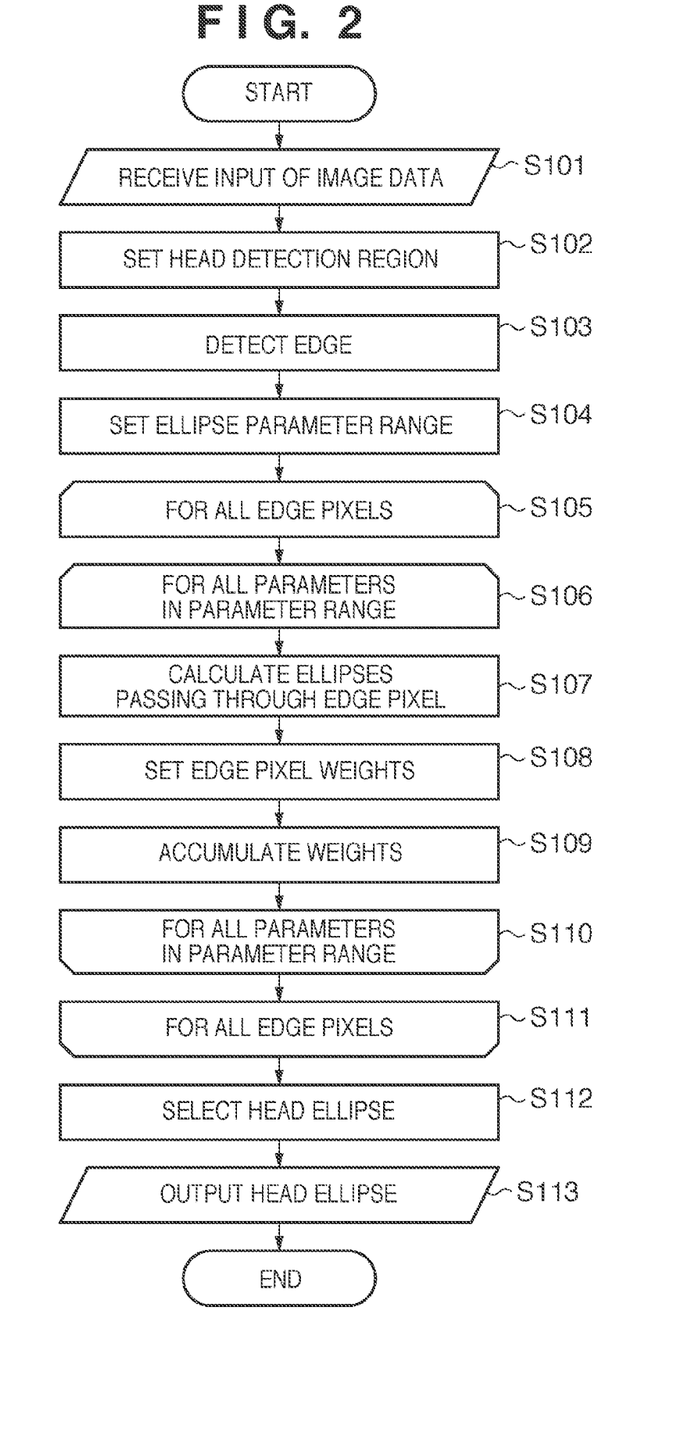
FIG. 2 is a flowchart showing an example of a processing procedure performed by a human head region detection unit.

Next is a description of steps of processing executed by the head region detection apparatus 100 of the present embodiment with reference to the flowchart shown in FIG. 2.

In S101, image data 101 is input from an image data input unit (not shown) to the head region detection apparatus 100. The image data 101 may be a still image, or may be a frame image in a continuous video.

In S102, the head-detection-region setting unit 102 receives an input, from a user interface, of a region surrounding a head region in the image data that was input. Specifically, a head-detection-region setting is received from a user via a keyboard 1004 or a pointing device 1005 that are described later. This region may be a square, polygonal, circular, or elliptical region.

In S103, the edge detection unit 103 detects edge pixels in the head-detection region set in S102. The edge pixels can be detected by, for example, calculating a gradient image with use of an edge detection operator, such as Sobel, Prewitt, or Laplacian, and binarizing the gradient image based on a predetermined threshold. Instead of an edge detection operator, the edge pixels may be detected with use of a canny edge detection method, a zero-crossing edge detection method, a morphology edge detection method, or the like. In this way, a plurality of pixels in the contour of a head are detected as edge pixels in the input image data in S103.

Figure 3:
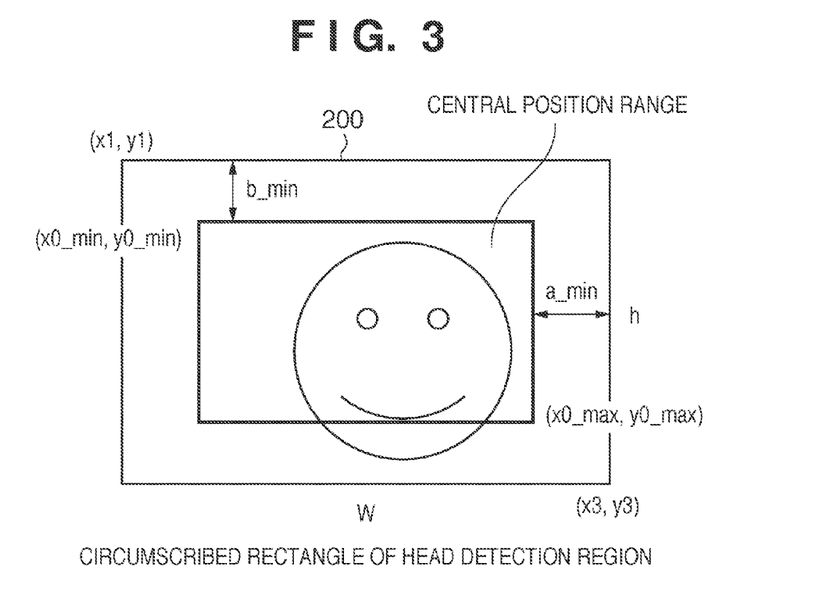
FIG. 3 is a diagram showing an example of the setting of an ellipse parameter variation range in Hough transformation.

In S104, the parameter setting unit 104 sets an ellipse parameter variation range (i.e., ellipse parameter space) for Hough transformation as shown in FIG. 3, based on the size of the head-detection region that was set. The upper left coordinate and lower right coordinate of a circumscribed rectangle 200 of the head-detection region are represented by (x1, y1) and (x3, y3) respectively, and the horizontal and vertical sizes (lengths) are represented by w and h. In this case, the parameter setting unit 104 first sets a variation range for the ordinate-axis length b and the abscissa-axis length a in proportion to the size of the head-detection region, as shown in Equation (1). Here, α and β are predetermined parameters.

minimum value of $\alpha = \alpha \cdot w$ minimum value of $b = \alpha \cdot h$ maximum value of $\alpha = \beta \cdot w$ maximum value of $b = \beta \cdot h$ (1)

Next, the range for the ellipse central coordinate (x0, y0) is set with use of Equation (2).

minimum value of $x0 = x1 + \alpha\_min$ minimum value of $y0 = y1 + b\_min$ maximum value of $x0 = x3 - \alpha\_min$ maximum value of $y0 = y3 - b\_min$ (2)

Note that a_min and b_min are predetermined values.

Then, the range for the ellipse rotation angle θ [minimum value of θ, maximum value of θ] is set according to application use cases of the head region detection apparatus 100.

In S105, the accumulation unit 106 repeats the processing of S106 to S110 for all of the edge pixels in the head-detection region set by the head detection region setting unit 102.

In S106, the accumulation unit 106 repeats the processing of S107 to S109 with respect to the ellipse parameter space set in S104.

In S107, the weight setting unit 105 calculates an ellipse that passes through the edge pixel of interest within the ellipse parameter space. Specifically, the weight setting unit 105 calculates a central X axis coordinate and central Y axis coordinate (x0, y0), an ordinate-axis length b, an abscissa-axis length a, and a rotation angle θ of an ellipse that passes through the edge pixel of interest within the ellipse parameter range set in S104. In this way, in S107, for each of the edge pixels, a plurality of ellipses that pass through the edge pixel are determined as ellipse candidates within the parameter section including predetermined parameters that define an ellipse.

Figure 4A:
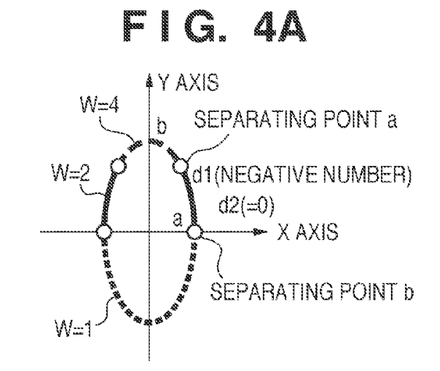
FIGS. 4A and 4B are diagrams showing examples of weight setting based on the vertical position (horizontal position) of an edge pixel.
Figure 4B:
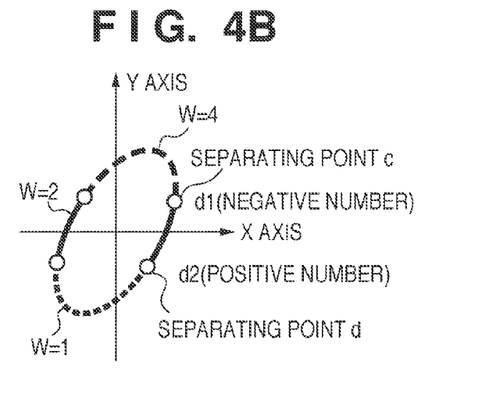

In S108, the weight setting unit 105 sets a weight based on the position of the edge pixel in the ellipse (x0, y0, b, a, θ) that was obtained in S107, that is in the ellipse parameter space, and that passes through the edge pixel. As shown in FIGS. 4A and 4B, the coordinates of the edge pixel are represented by (x, y), and perpendicular distances from separating points to the ellipse center (X axis) are represented by d1 and d2. In other words, the separating points are points separated from the X axis by the predetermined distances d1 and d2. Since the central position of the ellipse that passes through the edge pixel is (x0, y0), a weight is set as shown in Equation (3).

$$w = \begin{cases} 4 & y - y0 \le d1 \\ 2 & d1 < y - y0 \le d3 \\ 1 & d2 < y - y0 \end{cases} \quad (3)$$

Note that the separating points referred to here are each a point that is a boundary demarcating an upper head portion and a lower head portion in an ellipse (head ellipse) approximating a head. Also, d1 and d2 are predetermined values, and the separating point that is the distance d1 away from the X axis corresponds to the point indicating the boundary between the upper head portion and the remaining portion of the ellipse. Meanwhile, the separating point that is the distance d2 away from the X axis indicates the boundary between the lower head portion and the remaining portion of the ellipse.

Also, if a separating point is higher than the X axis (i.e., if the y coordinate of the separating point is positive), the perpendicular distance d1 or d2 from the separating point to the X axis is assumed to be a negative number. On the other hand, if a separating point is lower than the X axis (i.e., if the y coordinate of the separating point is negative), the perpendicular distance d1 or d2 from the separating point to the X axis is assumed to be a positive number. As shown in FIGS. 4A and 4B, the perpendicular distances from the separating point a and the separating point c to the X axis are negative numbers, the perpendicular distance from the separating point b to the X axis is 0, and the perpendicular distance from the separating point d to the X axis is a positive number. In this way, for each of the edge pixels, an evaluation value (in the above-described example, the weight of the edge pixel of interest) is calculated in S108 for each of the ellipse candidates determined for the edge pixel, based on the position of the edge pixel in the ellipse candidate.

In S109, the accumulation unit 106 accumulates the weight of the edge pixel of interest that was obtained in S108 for the ellipse (x0, y0, b, a, θ) that passes through the edge pixel of interest.

In S110, the accumulation unit 106 determines whether the processing of S107 to S109 has ended for all of the ellipses in the ellipse parameter range that was set. If such processing has ended for all of the ellipses, the procedure advances to S111.

In S111, the accumulation unit 106 determines whether the processing of S106 to S110 has ended for all of the edge pixels in correspondence with S105. If such processing has ended for all of the edge pixels, the procedure advances to S112, and otherwise the processing of S106 to S110 is performed for another edge pixel.

In S112, based on the weighted edge-pixel counts for the ellipses in the ellipse parameter space that were obtained by the accumulation unit 106, the head-ellipse selection unit 107 selects the ellipse having the highest weighted edge pixel count (accumulated evaluation value) as the head ellipse 108.

In S113, the head-ellipse selection unit 107 outputs the head ellipse 108 selected in S112.

As described above, in the present embodiment, for each edge pixel, an evaluation value is calculated for each ellipse candidate determined for the edge pixel, based on the position of the edge pixel in the ellipse candidate. Then, the evaluation values are accumulated for each of the ellipse candidates, and the ellipse candidate having the highest accumulated evaluation value is selected as the head ellipse. For this reason, by calculating a higher evaluation value for the upper head portion that favorably indicates the head, it is possible to reduce the negative influence of noise edges and highly accurately detect a head ellipse in an image in which a person's head appears.

Also, in the present embodiment, an evaluation value (edge-pixel weight) is calculated based on the vertical position and horizontal position of an edge pixel in an ellipse candidate. For this reason, there is no need for complicated calculation, and evaluation values can be calculated with a low calculation cost.

As described above, in the configuration of the present embodiment, weights are calculated for edge pixels based on the positions of the edge pixels in ellipses within the ellipse parameter section in Hough transformation, and the calculated weights are accumulated in the ellipse parameter section. For this reason, a convex arc that is a characteristic of the upper head portion can be detected with priority, and upper body edges are not likely to influence head detection. Also, the number of cases where a horizontal edge or vertical edge in the background region is erroneously detected as an ellipse arc is reduced.

Note that although the accumulation unit 106 sets weights with use of a stepwise function based on the positions of an edge pixel in ellipses in the present embodiment, besides a stepwise function, the accumulation unit 106 may set edge-pixel weights with use of a continuous function, a smooth function including continuous first derivatives, or the like.

Also, although the ordinate-axis length and the abscissa-axis length are treated independently as ellipse parameters in the present embodiment, the ordinate-axis length and the abscissa-axis length may be restricted to the same value. Also, although the slope angle of the ellipse is varied, a configuration is possible in which the ellipse is assumed to not be tilted, and the slope angle is not treated as a parameter.

Note that although the head-detection region is set by input from the user interface in the present embodiment, a configuration is possible in which a face is detected with use of face-detection technology, and the head-detection region is set based on the face region. Also, in the case where the input data is a continuous video, a head-detection region in the current frame may be set based on the head region detected in a previous frame.

Also, although the Hough transformation parameter space is set with use of the head-detection region in the present embodiment, a configuration is possible in which a face is detected with use of face-detection technology, and the Hough transformation parameter space is set based on the face region. Also, in the case where the input data is a continuous video, the Hough transformation parameter space in the current frame may be set based on the head region detected in a previous frame.

Hardware Configuration

Figure 5:
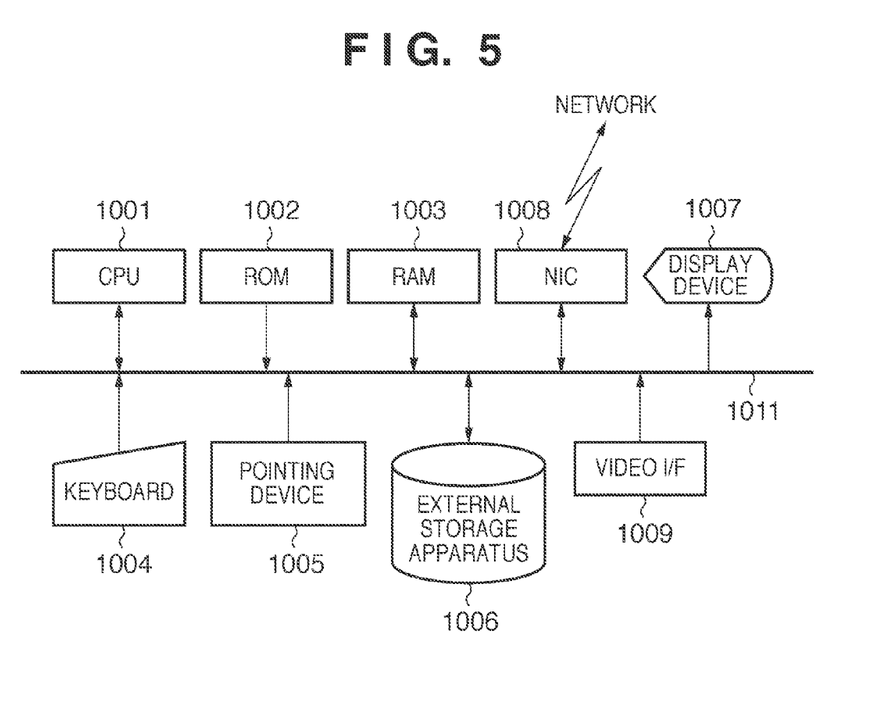
FIG. 5 is a block diagram showing an example of a hardware configuration of the human head region detection apparatus.

FIG. 5 is a block diagram showing a hardware configuration of a computer for realizing the head region detection apparatus 100 of the present embodiment. In FIG. 5, reference numeral 1001 denotes a CPU (Central Processing Unit) that executes various types of control in the head-region detection apparatus 100 of the present embodiment. Reference numeral 1002 denotes a ROM (Read Only Memory) that stores various types of data and a boot program executed when the apparatus is started up. Reference numeral 1003 denotes a RAM (Random Access Memory) that stores a control program executed by the CPU 1001 in order to perform processing, as well as provides a work area for when the CPU 1001 executes various types of control. Reference numeral 1004 denotes a keyboard, reference numeral 1005 denotes a pointing device, and these provide an environment in which the user performs various types of input operations.

Reference numeral 1006 denotes an external storage apparatus that is configured by a hard disk, a flexible disk, an optical disk, a magnetic disk, a magneto-optical disk, a magnetic tape, or the like. It should be noted that the external storage apparatus 1006 is not necessary as a constituent element if all of the various types of data and the control program are held in the ROM 1002.

Reference numeral 1007 denotes a display device that is configured by a display or the like, which displays results and the like to the user. The display device 1007 configures a user interface in cooperation with the keyboard 1004, the pointing device 1005, and the like.

Reference numeral 1008 denotes a network interface. Reference numeral 1009 denotes a video interface that enables the input of frame images via an imaging unit and a coaxial cable. Also, reference numeral 1011 denotes a bus that connects the configurations described above.

Next is a description of other another embodiment. The present embodiment differs from the above-described embodiment with respect to the method for setting edge-pixel weights. The other aspects of processing are the same as in the above-described embodiment, and therefore descriptions thereof have been omitted. The functional configuration of the present embodiment is similar to that of the above-described embodiment shown in FIG. 1, and the processing procedure is the same as that shown in the flowchart of FIG. 2.

Figure 6:
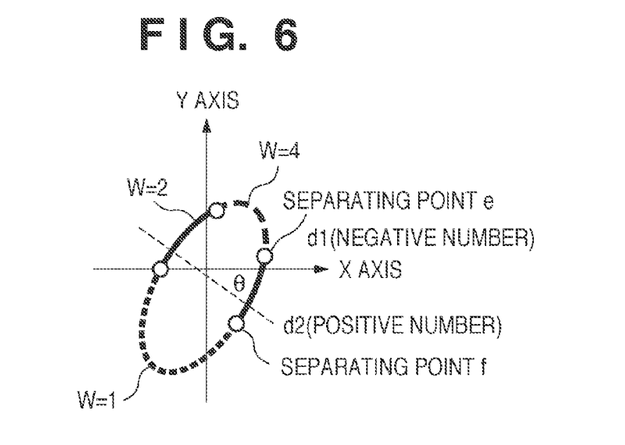
FIG. 6 is a diagram showing an example of weight setting for an edge pixel based on a position in the rotation direction of an ellipse.

In the present embodiment, as shown in FIG. 6, the weight setting unit 105 sets the weight of the edge pixel based on the position of the edge pixel in the ellipse (x0, y0, b, a, θ) that was obtained in S107, that is in the ellipse parameter space, and that passes through the edge pixel, in the rotation direction of the ellipse.

The coordinates of the edge pixel are represented by (x, y), and the abscissa axis of the rotated ellipse is represented by H'. The perpendicular distance from a separating point e that is the boundary with the upper head portion to H' is represented by d1, and the perpendicular distance from a separating point f that is the boundary with the lower head portion to H' is represented by d2. The distance from the edge pixel (x, y) to H' is obtained with use of Equation (4). Here, the ellipse center (x0, y0) is assumed to be the center of rotation, and in the case of rotating the Y axis in the rightward direction, the angle θ is assumed to be a positive number.

$$y' = x \sin \theta + y \cos \theta \quad (4)$$

Based on the difference between the coordinate y' of the rotated Y axis and y0, the weight of the edge pixel (x, y) is set with use of Equation (5).

$$w = \begin{cases} 4 & y' - y0 \leq d1 \\ 2 & d1 < y' - y0 \leq d2 \\ 1 & d2 < y' - y0 \end{cases} \quad (5)$$

Similarly to the above-described embodiment, the weights obtained with use of Equation (5) are accumulated, and the head ellipse having the largest accumulated weight value is selected.

As described above, in the present embodiment, separating points for the upper head portion and lower head portion in the coordinate system rotated in conformity with the rotation angle θ of the ellipse are set, and accumulated values of edge-pixel weights are calculated. In other words, evaluation values are calculated based on the vertical positions and horizontal positions of edge pixels in ellipse candidates in the coordinate system rotated in conformity with the rotation angle of the ellipse, and a head ellipse is selected. For this reason, even if the head of the imaging subject is tilted, it is possible to obtain an appropriate head ellipse with high accuracy.

Functional Configuration

Figure 7:
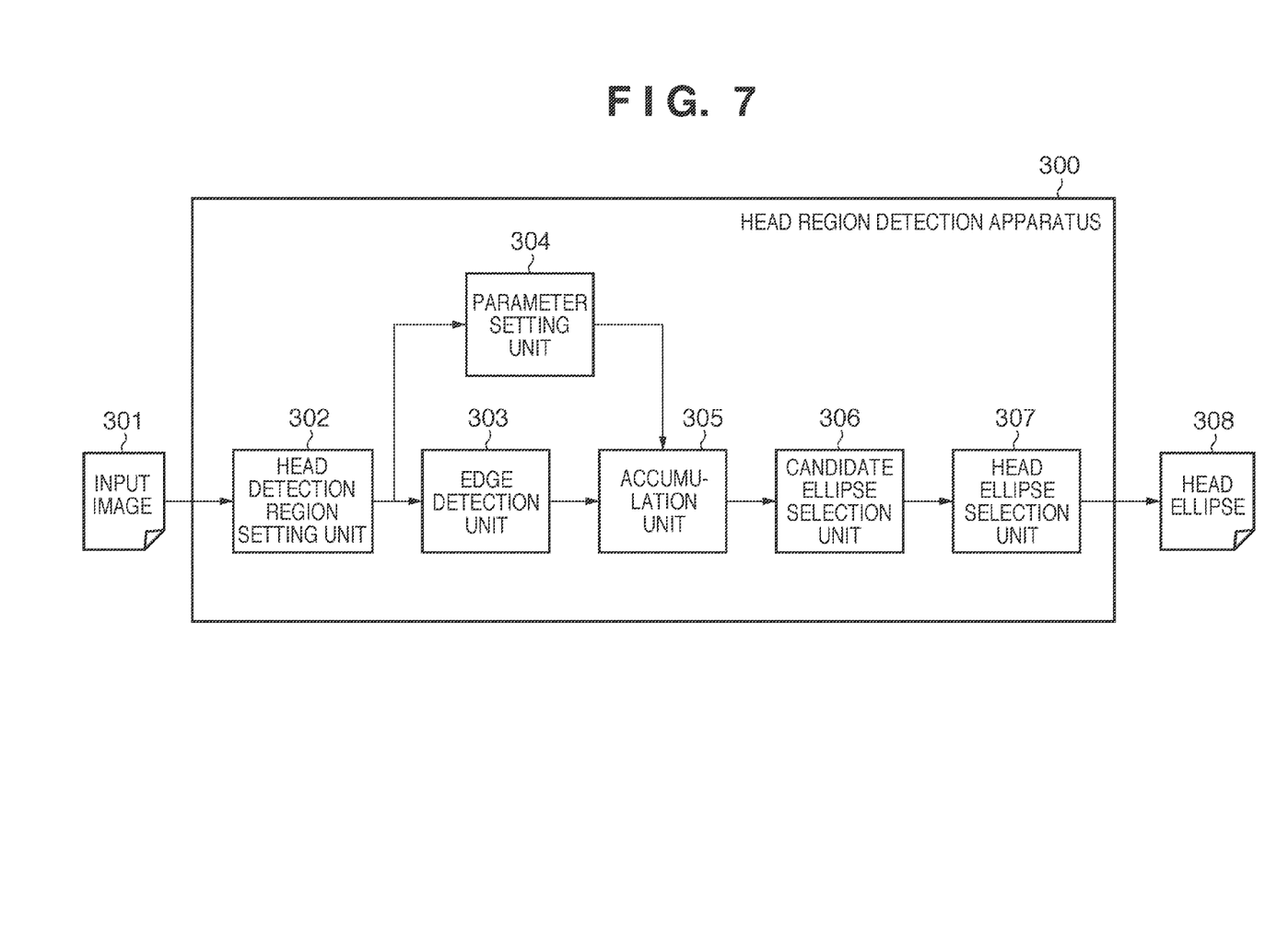
FIG. 7 is a block diagram showing an example of a functional configuration of another human head region detection apparatus.

FIG. 7 is a block diagram showing an example of a functional configuration of a head region detection apparatus 300 of yet another embodiment. The present embodiment differs from the above-described embodiments (FIG. 1) in that the edge-pixel weight setting unit 105 has been omitted from the head region detection apparatus 300, and a candidate-ellipse selection unit 306 has been added. The processing of processing units 302, 303, and 304 in the present embodiment is similar to the processing of the processing units 102, 103, and 104 in the above-described embodiments, and therefore a detailed description thereof has been omitted.

An accumulation unit 305 simply accumulates the number of edge pixels for each ellipse in the ellipse parameter section set by a parameter setting unit 304, without performing weighting. The candidate-ellipse selection unit 306 sorts the edge-pixel counts obtained by the accumulation unit 305 for each ellipse, and selects N ellipses having the highest pixel counts as candidate ellipses. As will be described later, N is an integer set according to the size of the ellipse parameter space.

A head-ellipse selection unit 307 calculates a comprehensive index based on the below indices for the N candidate ellipses selected by the candidate-ellipse selection unit 306, and selects the ellipse having the top comprehensive index as a head ellipse 308.

Figure 8:
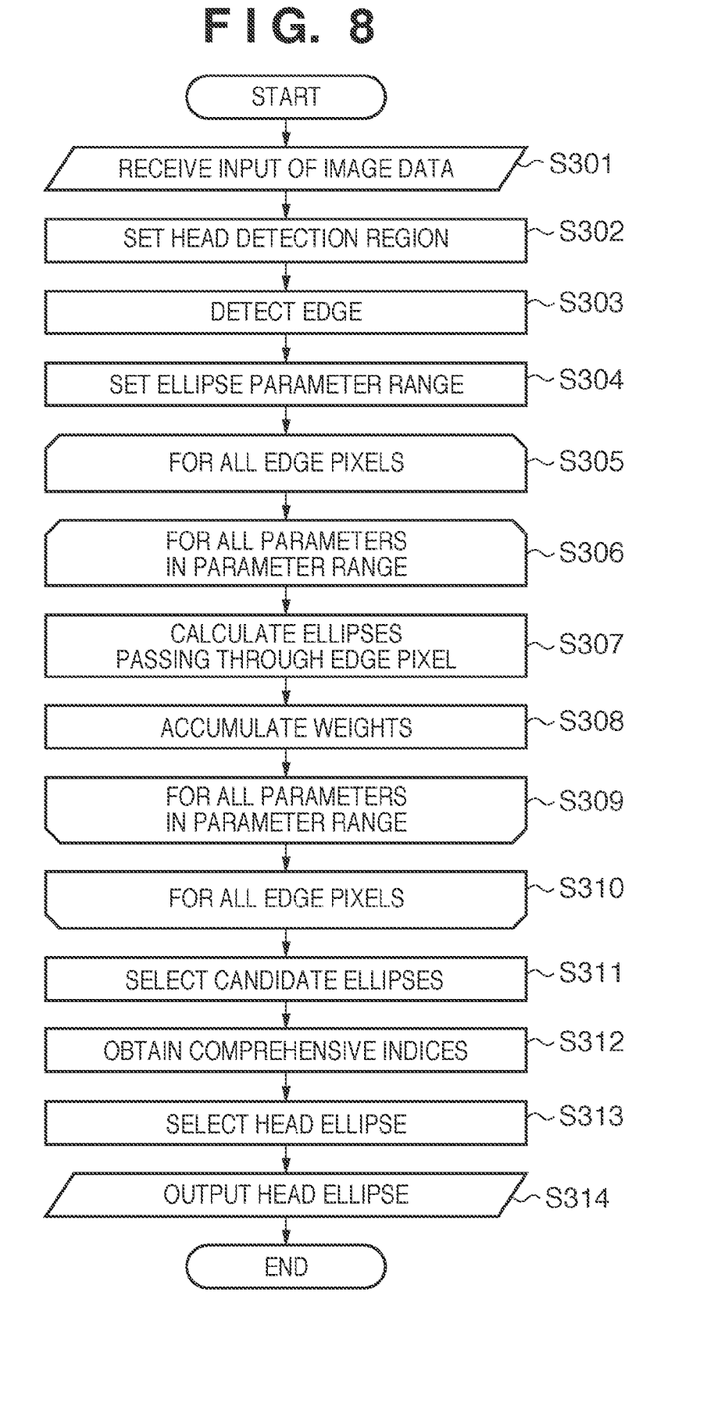
FIG. 8 is a flowchart showing an example of a processing procedure performed by a human head region detection unit.

(1) "Relative pixel count" index for selecting large ellipses with priority (2) "Pixel count/circumferential length" index for selecting small ellipses with priority (3) "Pixel count/arc length" index for selecting ellipses with emphasis on the edge arc at the top of the ellipse (4) "Circularity" index for selecting ellipses having a predetermined shape with priority Processing Procedure Below is a detailed description of a processing flow of the present embodiment with reference to FIG. 8. Since the processing steps S301 to S310 differ from steps S101 to S111 of the processing steps of the above-described embodiments (FIG. 2) only in that S108 has been omitted, and the other aspects of processing are the same, a detailed description of such processing has been omitted.

In S311, the candidate-ellipse selection unit 306 sorts the accumulated edge-pixel counts for each ellipse that were calculated in step S308, and selects N ellipses having the highest pixel counts. Here, N is a parameter, and is set according to the size of the ellipse parameter space.

In S312, the head-ellipse selection unit 307 calculates a comprehensive index for the selected N candidate ellipses based on the below ellipsoidality indices (1) to (4). Note that the edge-pixel counts of the N candidate ellipses are represented by $n_k$ (k=1, 2, ..., N).

(1) "Relative Pixel Count" Index for Selecting Large Ellipses with Priority

The "relative pixel count" index is a relative ratio of edge-pixel counts, and is calculated with use of Equation (6). As can be understood from Equation (6), the "relative pixel count" index is an index that indicates the number of edge pixels on an ellipse with respect to the maximum number of edge pixels that can exist on the ellipse.

$$\text{relative pixel count} = \frac{n_k}{\max(\{n_k \mid k = 1, 2, \ldots, N\})} \quad (6)$$

$$k = 1, 2, \ldots, N$$

(2) "Pixel Count/Circumferential Length" Index for Selecting Small Ellipses with Priority The "pixel count/circumferential length" index is calculated with use of Equation (7). Here, $a_k$ and $b_k$ are respectively the major axis and minor axis of the k-th candidate ellipse. Although considered to be proportionate to $(a_k+b_k)$, the circumferential length of the ellipse may be calculated by the original ellipse circumferential length equation shown in Equation (8). As can be understood from Equations (7) and (8), the "pixel count/circumferential length" index is an index that indicates the number of edge pixels with respect to the circumferential length.

$$\text{pixel count/circumferential length} = \frac{n_k}{a_k + b_k} \quad (7)$$

$$k = 1, 2, \ldots, N$$

$$L = \pi(a+b)\left\{1 + \frac{1}{4}\cdot\left(\frac{a-b}{a+b}\right)^2 + \frac{1}{64}\cdot\left(\frac{a-b}{a+b}\right)^4 + \frac{1}{256}\cdot\left(\frac{a-b}{a+b}\right)^6 + \ldots\right\} \quad (8)$$

Figure 9A:
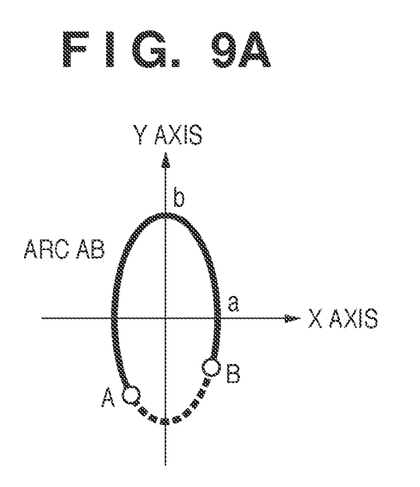
FIGS. 9A and 9B are diagrams showing arc lengths AB of ellipse arcs formed by edge pixels.
Figure 9B:
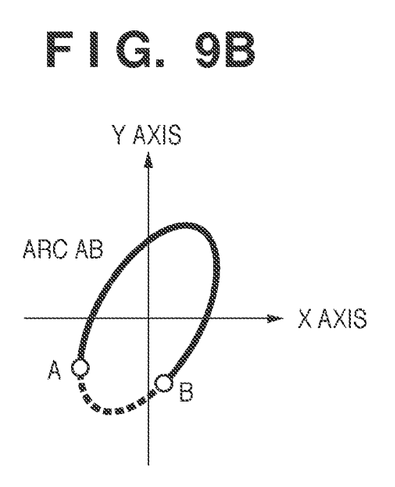

(3) "Pixel Count/Arc Length" Index for Selecting Ellipses with Emphasis on the Edge Arc at the Top of the Ellipse As shown in FIGS. 9A and 9B, the lowest pixel of the left ellipse arc is represented by A, and the lowest pixel of the right ellipse arc is represented by B. Also, the arc length of the upper ellipse arc from A to B in the counterclockwise direction is represented by $AB_k$. The "pixel count/arc length" index is calculated with use of Equation (9). Here, when generating a candidate ellipse, the arc length $AB_k$ is the number of pixels in the ellipse on the arc between A and B. In this way, the "pixel count/arc length" index is an index indicating the number of edge pixels with respect to the arc length.

$$\text{pixel count/arc length} = \frac{n_k}{AB_k} \quad (9)$$

$$k = 1, 2, \ldots, N$$

(4) "Circularity" Index for Selecting Ellipses Having a Predetermined Shape with Priority Letting the major axis and minor axis of the candidate ellipses respectively be $a_k$ and $b_k$, the circularity index is calculated with use of Equation (10). Here, $\alpha$ is a parameter, and is a value calculated with use of statistics taken on the shape of the human head. In this way, the "circularity" index is an index indicating the circularity of an ellipse.

$$\text{circularity} = \begin{cases} \alpha \cdot \dfrac{b_k}{a_k} & b_k < a_k \\ \dfrac{a_k}{\alpha \cdot b_k} & a_k < b_k \end{cases} \quad (10)$$

$$k = 1, 2, \ldots, N$$

The comprehensive index is calculated by a linear combination of the above-described four indices (1) to (4).

$$\text{comprehensive index} = \alpha \cdot \text{relative pixel count} + \quad (11)$$

$$\beta \cdot \frac{\text{pixel count}}{\text{circumferential length}} + \gamma \cdot \text{circularity} + \Delta \cdot \frac{\text{pixel count}}{\text{arc length}}$$

$$\alpha + \beta + \gamma + \Delta = 1$$

$$\alpha \geq 0, \beta \geq 0, \gamma \geq 0, \Delta \geq 0$$

Although the comprehensive index is a linear combination of the indices here, the comprehensive index may be a linear combination of monotone functions of the indices. Also, a configuration is possible in which the comprehensive index is a linear combination of two or three indices among the four ellipsoidality indices. Furthermore, besides a linear combination, a configuration is possible in which the comprehensive index is an addition combination, multiplication combination, or the like, or another general function.

Also, instead of the comprehensive index being configured by a function of the indices, a configuration is possible in which evaluation is performed using one index, and if a plurality of ellipses that have the same evaluation value exist, the ellipses having the same evaluation value are evaluated using another index, and selection is performed. Also, a configuration is possible in which, if a plurality of ellipses that have the same evaluation value exist, the ellipses having the same evaluation value are again evaluated using another index. Similarly, a configuration is possible in which only two or three indices among the four indices are used.

Also, instead of the comprehensive index being configured by a function of the indices, a configuration is possible in which, for each index, if the evaluation value of a candidate ellipse falls within a predetermined range as shown in Equation (12), the candidate ellipse is selected as a head ellipse. In this case, if a plurality of head ellipses exist within the predetermined range, a head ellipse may be furthermore selected with use of another one of the indices. Similarly, although all of the four ellipsoidality indices are used to determine whether a head ellipse falls within the predetermined range, a configuration is possible in which only two or three indices among the four ellipsoidality indices are used. If no ellipse satisfies Equation (12), head detection is considered to have failed.

$$\begin{cases} th_1 \leq \text{relative pixel count} \leq th_2 \\ th_3 \leq \text{pixel count/circumferential length} \leq th_4 \\ th_5 \leq \text{circularity} \leq th_6 \\ th_7 \leq \text{pixel count/arc length} \leq th_8 \end{cases} \quad (12)$$

Note that although the head-ellipse selection unit 307 selects a head ellipse from among candidate ellipses with use of a combination of the four indices, a configuration is possible in which the head-ellipse selection unit 307 selects a head ellipse with use of only the "pixel count/arc length" index for selecting an ellipse with emphasis on the edge arc at the top of the ellipse. Similarly, it is possible to select a head ellipse with use of only the "circularity" index for selecting an ellipse having a predetermined shape with priority.

In S313, the head-ellipse selection unit 307 selects, as the head ellipse 308, the ellipse having the top evaluation value in accordance with the comprehensive index obtained in S312. In S314, the head-ellipse selection unit 307 outputs the head ellipse 308 selected in S313.

As described above, according to the present embodiment, when selecting a head ellipse, it is possible to select the ellipse most closely approximating a head with priority from among candidate ellipses having the highest accumulated values, with use of a combination of different head ellipsoidality indices. As described above, the following are examples of head ellipsoidality indices.

Figure 10:
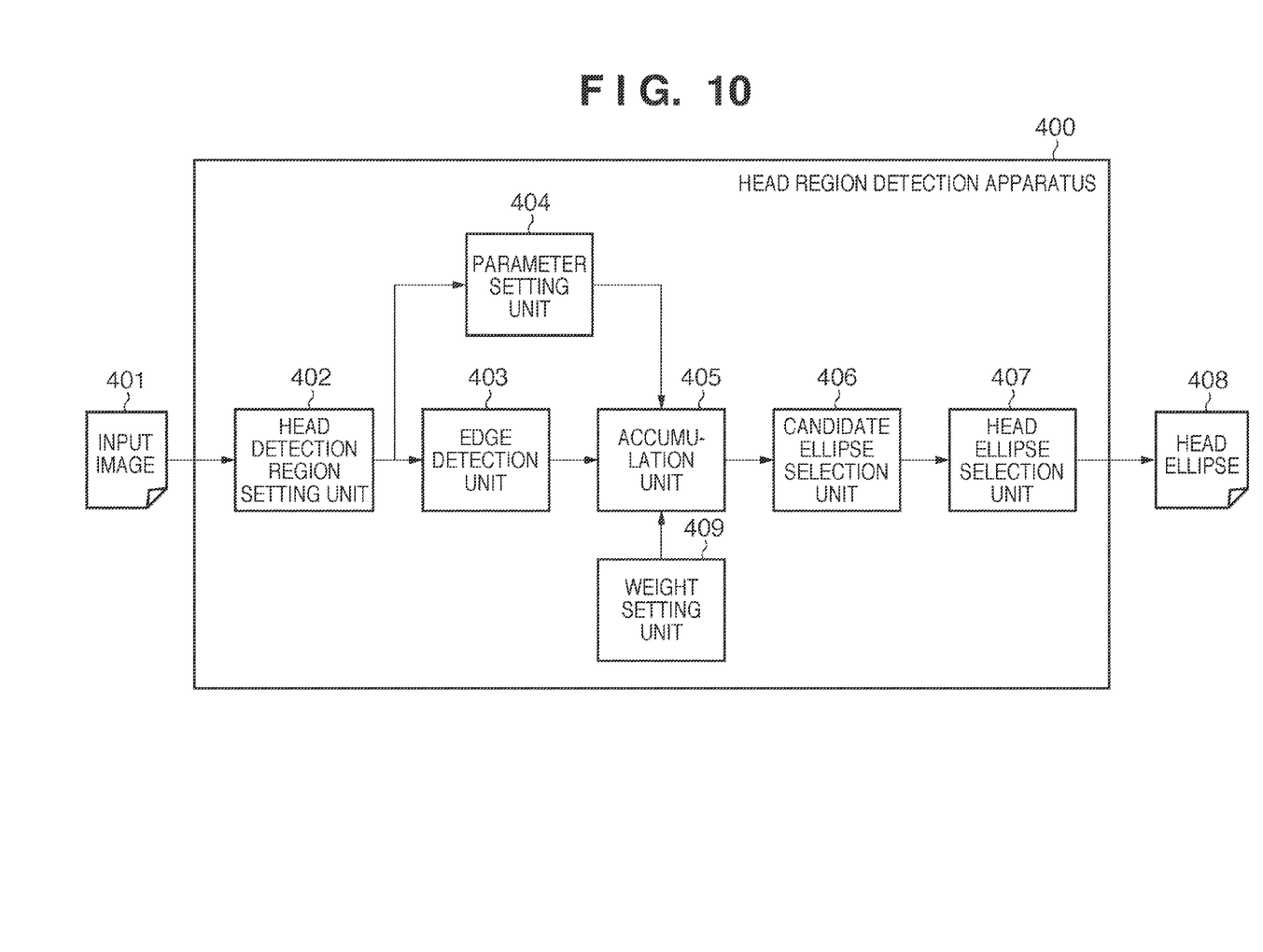
FIG. 10 is a block diagram showing an example of a functional configuration of yet another human head region detection apparatus.

Accumulated value relative ratio index for selecting large ellipses with priority Edge pixel count/ellipse circumferential length ratio index for selecting small ellipses with priority Edge pixel count/upper ellipse arc length ratio index for selecting ellipses with emphasis on an edge arc at the top of the ellipse Ellipse major axis/minor axis ratio index for selecting ellipses having a predetermined shape with priority Functional Configuration FIG. 10 is a block diagram showing an example of a functional configuration of a head region detection apparatus 400 according to yet another embodiment. The configuration of the present embodiment differs from the configuration of the embodiment shown in FIG. 7 in that a weight setting unit 409 has been added. Although the case in which for each edge pixel, the same evaluation value is calculated for each ellipse candidate regardless of the position of the edge pixel in the ellipse candidate, has been described in the embodiment shown in FIG. 7, the case of performing weighting based on the position of an edge pixel is described in the present embodiment. In the present embodiment, the processing of the processing units 402, 403, 404, 405, and 409 is the same as the processing of the processing units 102, 103, 104, 106, and 105 in previously described embodiments (FIG. 1), and therefore a detailed description thereof has been omitted.

A candidate-ellipse selection unit 406 uses accumulated weighted edge-pixel counts instead of accumulated edge-pixel counts to select N ellipses having the highest accumulated values as candidate ellipses.

Similarly to the head-ellipse selection unit 307 of the embodiment shown in FIG. 7, the head-ellipse selection unit 407 calculates the following four indices with use of Equations (6), (7), (9), and (10), determines a comprehensive index by combining these indices, and selects the ellipse having the top comprehensive index as a head ellipse 408.

(1) "Relative pixel count" index for selecting large ellipses with priority (2) "Pixel count/circumferential length" index for selecting small ellipses with priority (3) "Pixel count/arc length" index for selecting ellipses with emphasis on the edge arc at the top of the ellipse (4) "Circularity" index for selecting ellipses having a predetermined shape with priority Also, in the present embodiment, edge-pixel weights set by the weight setting unit 409 may be reflected in the four ellipsoidality indices. In the following, the weighted edge-pixel counts of the N candidate ellipses are represented by $wn_k$ (k=1, 2, ..., N).

(1) The "relative pixel count" index is calculated with use of Equation (13).

$$\text{relative pixel count} = \frac{wn_k}{\max(\{wn_k \mid k = 1, 2, \ldots, N\})} \quad (13)$$

$$k = 1, 2, \ldots, N$$

(2) The "pixel count/circumferential length" index is calculated with use of Equation (14).

Figure 11A:
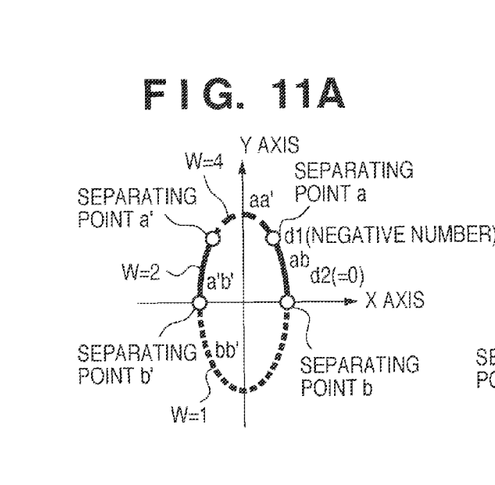
FIGS. 11A to 11F are diagrams showing the calculation of a "pixel count/circumferential length" index.
Figure 11B:
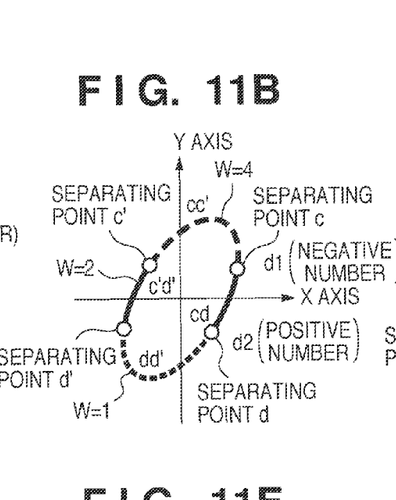
Figure 11C:
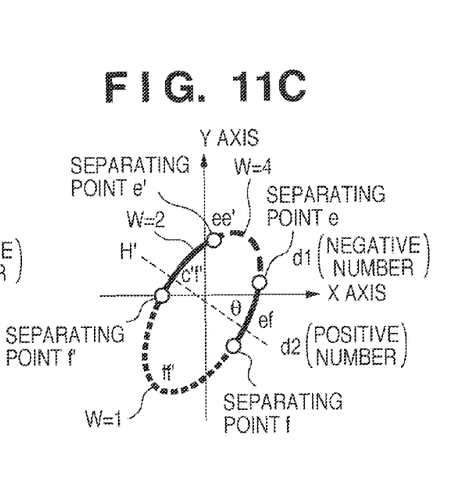

Here, $w_{xy}$ is the weight of the arc xy, and $n_{xy}$ is the number of pixels in (the length of) the arc xy. Note that if weighting is set using a general function instead of a stepwise function, an integration of weights is obtained instead of a sum of denominators in Equation (14). Arcs and their weights are shown in FIGS. 11A to 11C.

$$\text{pixel count/circumferential length} = \frac{wn_k}{w_{aa'} \cdot n_{aa'} + w_{a'b'} \cdot n_{a'b'} + w_{ab} \cdot n_{ab} + w_{bb'} \cdot n_{bb'}} \quad (14)$$

$$k = 1, 2, \ldots, N$$

Figure 11D:
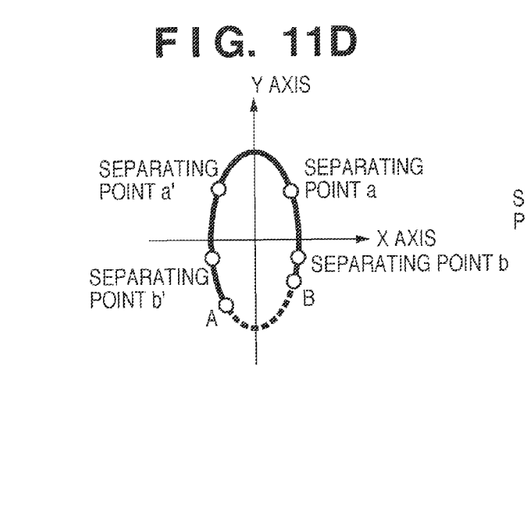
Figure 11E:
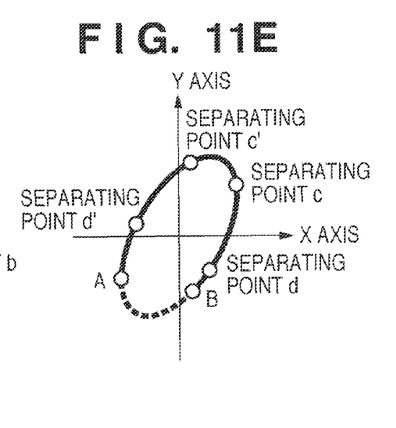
Figure 11F:
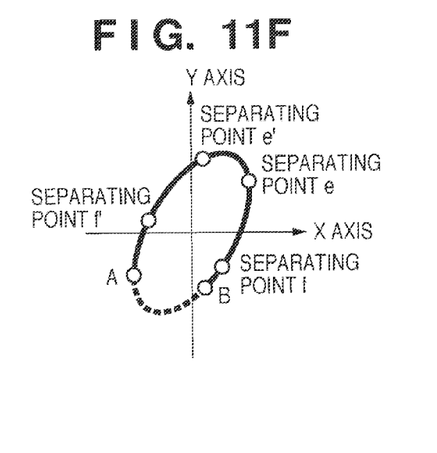

(3) The "pixel count/arc length" index is calculated with use of Equation (15). Here, $w_{xy}$ is the weight of the arc xy, and $n_{xy}$ is the number of pixels in (the length of) the arc xy. Note that if weighting is set using a general function instead of a stepwise function, an integration of weights is obtained instead of a sum of denominators in Equation (15). Arcs are shown in FIGS. 11D to 11F.

$$\text{pixel count/arc length} = \frac{wn_k}{w_{aa'} \cdot n_{aa'} + w_{a'b'} \cdot n_{a'b'} + w_{ab} \cdot n_{ab} + w_{Ab'} \cdot n_{Ab'} + w_{Bb} \cdot n_{Bb}} \quad (15)$$

$$k = 1, 2, \ldots, N$$

(4) The "circularity" index is calculated similarly to the embodiment shown in FIG. 7.

Note that the comprehensive index can be obtained with use of Equation (11), similarly to the embodiment shown in FIG. 7.

Processing Procedure

Figure 12:
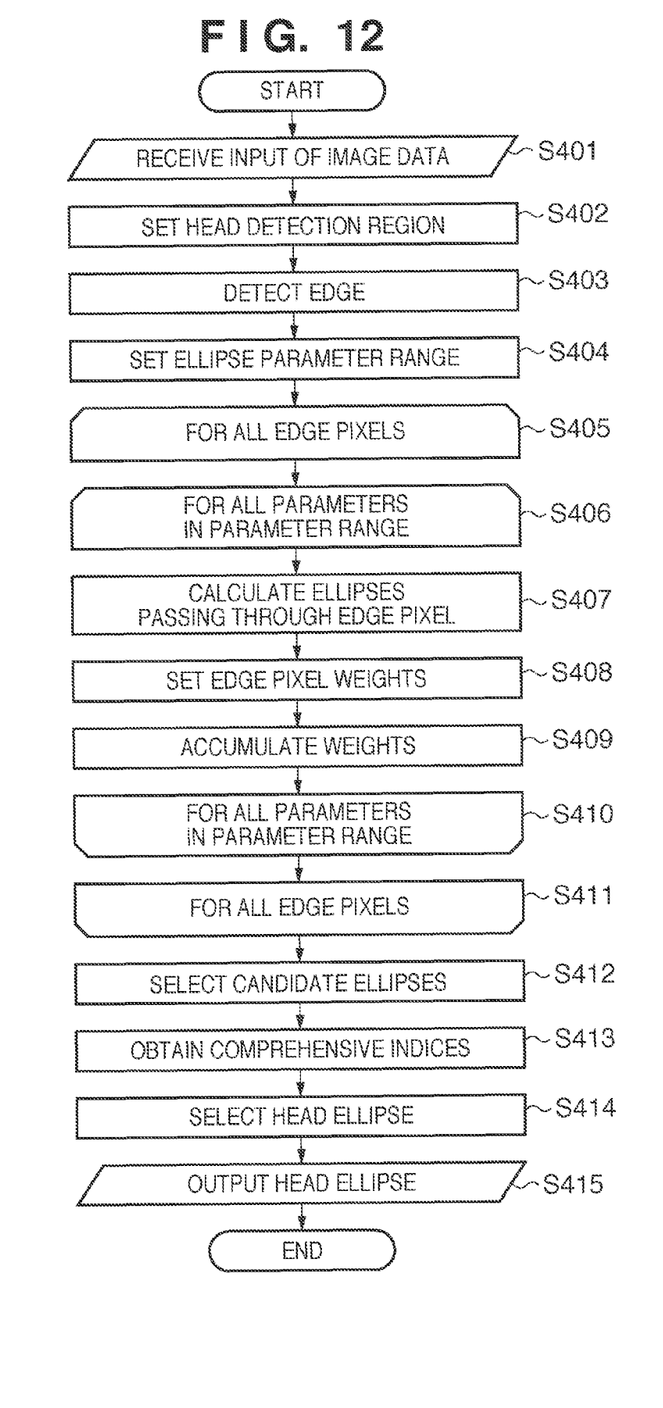
FIG. 12 is a flowchart showing an example of a processing procedure performed by the human head region detection unit.

A processing procedure of the present embodiment is shown in the flowchart of FIG. 12. The processing of S401 to S411 in FIG. 12 is similar to the processing of S101 to S111 in the processing steps of previously-described embodiments (FIG. 2), and therefore a description thereof has been omitted. Also, the processing of S412 to S415 is the same as the processing of S311 to S314 in the processing steps of a previously-described embodiment (FIG. 8), with the exception that the above-described weighted indices are obtained when obtaining a comprehensive index in S413.

As described above, in the present embodiment, weighting is performed on evaluation values, and a predetermined number of ellipse candidates are selected from among the ellipses having the highest accumulated evaluation values, similarly to a previously described embodiment. Then, a head ellipse is selected from among the ellipse candidates based on at least any one of the above-described four indices in which weighting has been reflected. For this reason, the present embodiment enables even more accurately detecting an appropriate head ellipse.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

The present invention enables providing technology for reducing the negative influence of human upper body edges and noise edges in the background, and highly accurately detecting, in an image in which a person's head appears, a head ellipse that approximates the contour of the head.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-241886, filed on Oct. 20, 2009 which is hereby incorporated by reference herein in its entirety.

What is claimed is:

1. An information processing apparatus comprising:
a detection unit that detects, as edge pixels, a plurality of pixels in a contour of a head of a person in an image in which the head appears;
a determination unit that, for each of the edge pixels, determines, as ellipse candidates, a plurality of ellipses that pass through the edge pixel in a parameter section including predetermined parameters that define an ellipse;
a calculation unit that, for each of the edge pixels, calculates an evaluation value based on, for each of the ellipse candidates determined for the edge pixel, a position of the edge pixel in the ellipse candidate;
an accumulation unit that accumulates the evaluation values for each of the ellipse candidates; and
a selection unit that selects an ellipse candidate having the highest accumulated evaluation value from the ellipse candidates as the head ellipse.

2. The information processing apparatus according to claim 1,
wherein the parameters are at least any one of a central X axis coordinate of an ellipse, a central Y axis coordinate of an ellipse, an ordinate axis length of an ellipse, an abscissa axis length of an ellipse, and a rotation angle of an ellipse, and
the parameter section is a section from a_minimum value to a maximum value of each of the parameters.

3. The information processing apparatus according to claim 1,
wherein the calculation unit calculates the evaluation value for each of the edge pixels based on a vertical position and a horizontal position of the edge pixel in the ellipse candidate.

4. The information processing apparatus according to claim 1,
wherein the calculation unit calculates the evaluation value for each of the edge pixels based on a vertical position and a horizontal position of the edge pixel in the ellipse candidate, in a coordinate system rotated in conformity with a rotation angle of an ellipse.

5. The information processing apparatus according to claim 1,
wherein the selection unit selects a predetermined number of ellipse candidates from among ellipse candidates having the highest accumulated evaluation values, and selects the head ellipse from among the predetermined number of ellipse candidates based on at least any one index among a ratio of the number of edge pixels on an ellipse to a maximum value of the number of edge pixels that can exist on the ellipse, a ratio of the number of edge pixels to a circumferential length, a ratio of the number of edge pixels to an arc length, and a circularity of an ellipse.

6. The information processing apparatus according to claim 5,
wherein for each of the edge pixels, the calculation unit calculates the same evaluation value for each of the ellipse candidates determined for the edge pixel, regardless of the position of the edge pixel in the ellipse candidate.

7. A control method for an information processing apparatus that determines, in an image in which a head of a person appears, a head ellipse approximating a contour of the head, comprising the steps of:
detecting, as edge pixels, a plurality of pixels in the contour of the head in the image;
determining, for each of the edge pixels, as ellipse candidates, a plurality of ellipses that pass through the edge pixel in a parameter section including predetermined parameters that define an ellipse;
calculating, for each of the edge pixels, an evaluation value based on, for each of the ellipse candidates determined for the edge pixel, a position of the edge pixel in the ellipse candidate;
accumulating the evaluation values for each of the ellipse candidates; and
selecting an ellipse candidate having the highest accumulated evaluation value from the ellipse candidates as the head ellipse.

8. A non-transitory computer-readable storage medium storing a program for causing a computer to function as the units included in an information processing apparatus comprising:
a detection unit that detects, as edge pixels, a plurality of pixels in a contour of a head of a person in an image in which the head appears;
a determination unit that, for each of the edge pixels, determines, as ellipse candidates, a plurality of ellipses that pass through the edge pixel in a parameter section including predetermined parameters that define an ellipse;
a calculation unit that, for each of the edge pixels, calculates an evaluation value based on, for each of the ellipse candidates determined for the edge pixel, a position of the edge pixel in the ellipse candidate;
an accumulation unit that accumulates the evaluation values for each of the ellipse candidates; and
a selection unit that selects an ellipse candidate having the highest accumulated evaluation value from the ellipse candidates as the head ellipse.

* * * * *